A. ZEMAN

INTERNAL COMBUSTION ENGINE

March 17, 1931.

Re. 18,003

Original Filed Aug. 2, 1926

2 Sheets-Sheet 1

Inventor:
Anton Zeman,
By Fisher, Fowler, Slaughter & Soans,
Attys

A. ZEMAN

March 17, 1931. INTERNAL COMBUSTION ENGINE Re. 18,003

Original Filed Aug. 2, 1926 2 Sheets-Sheet 2

Inventor:
Anton Zeman,

By Fisher, Towle, Clapp & Sonna, Attys.

Reissued Mar. 17, 1931

Re. 18,003

UNITED STATES PATENT OFFICE

ANTON ZEMAN, OF CHICAGO, ILLINOIS

INTERNAL-COMBUSTION ENGINE

Original No. 1,695,792, dated December 18, 1928, Serial No. 126,372, filed August 2, 1926. Application for reissue filed March 18, 1929. Serial No. 348,099.

This invention relates to internal combustion or gas engines but more especially to one of the four-cycle V-type in which the cylinders are arranged in pairs converging toward one another for connection to a common crank shaft and having an intermediate compression piston adapted to maintain and equalize the pressure of the gases in the combustion chambers to obtain simultaneous ignition, together with other associated mechanism.

Among the objects of the invention are to provide a novel and efficiently operating relation between the aligned pairs of pistons with connection to a common crank of the crank shaft, whereby, when the crank is in a dead-center position as to one piston, the worst position for delivering power to the crank shaft, it is always off, i. e., over or beyond the dead-center position as to the other piston, thus presenting one piston in a more advantageous position of operating efficiently to transmit power to the crank shaft with a leverage under which the pistons are moved on their working strokes with smoothness and ease beyond the dead center, preferably at a 45 degree angle instead of having the crank and connecting rods of both pistons in line, thereby not only facilitating the starting of the motor and of the working strokes of the pistons, but also providing for efficient subsequent operation; to provide a supplementary compression piston for equalizing the compression in both or each pair of aligned cylinders at the time of highest compression and firing, so that there is no loss of efficiency or power due to lack of compression in the working cylinders or improper timing thereof; to provide a novel arrangement of auxiliary compression cylinders and pistons therein and actuating means therefor, whereby the auxiliary piston will have a comparatively short stroke and a large area for the purpose of securing maximum compression as specified, without acting as a drag on the engine; to arrange for the proper assembly of the parts, whereby manufacturing operations are facilitated and proper timing of the actuating and controlling mechanism is readily obtained, and to generally improve and simplify the construction of engines to which the invention relates.

Other objects and advantages will be apparent as the description proceeds.

In the accompanying drawings:—

Fig. 3 is a sectional view taken on the line 3—3 of Figure 1.

Fig. 4 is a detail of a modified form of cam mechanism for actuating the auxiliary compression piston.

Figure 2:
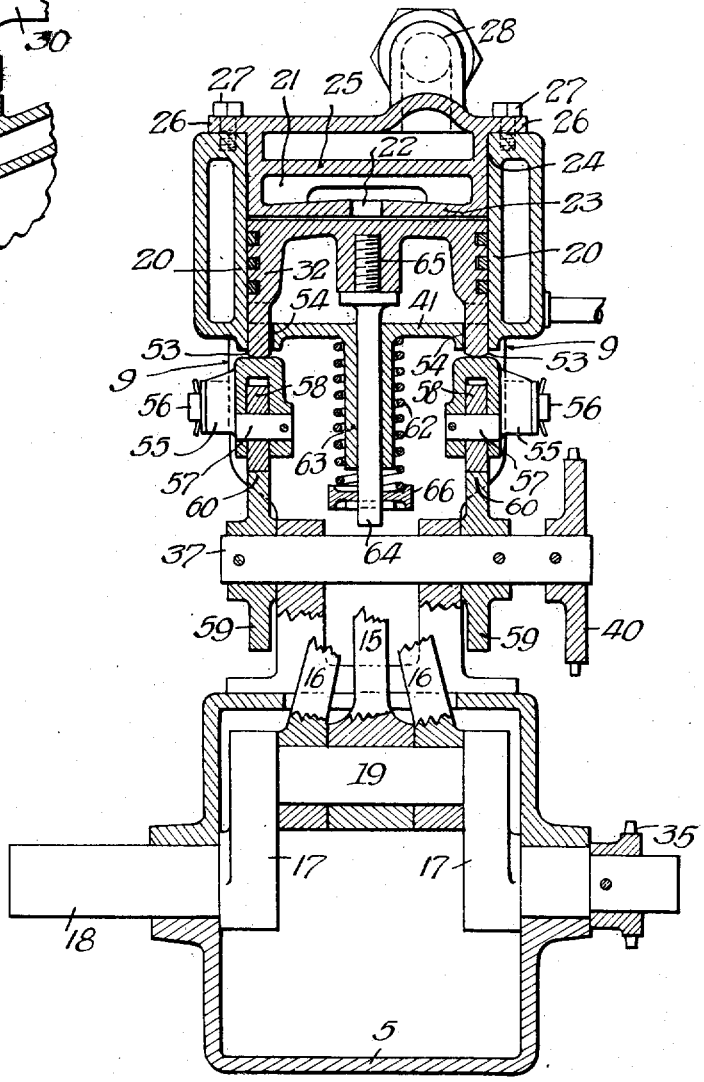
Fig. 2 is a central longitudinal sectional view taken at right angles to Figure 1, as indicated by the section line 2—2.

Referring to the drawings in detail, 6 is the crank casing which is bolted to the cylinders 7 and 8 placed in V-shaped relation inclined or converging downwardly toward each other at an angle of substantially 45 degrees and having jacketed upper walls 9 and heads 10. The heads 10 may be integral or detachable and bolted on in the usual manner, and are provided with central openings 11 to receive spark plugs or other ignition devices 12. Pistons 13 and 14 work in the cylinders 7 and 8 and the rods 15 and 16 thereof are connected to a common crank 17 of the crank shaft 18 suitably journaled in the crank case, as at 19, in such a manner that the piston 13 is slightly advanced on its forward stroke in firing position with respect to the piston 14. In this position, the connecting rod 16, which is bifurcated and straddles rod 15, as shown in Figure 2, is in a dead-center position with the crank 17 and connecting rod 19, while the connecting rod 15 is slightly past the upper dead-center position thereof rotating in a clockwise direction. The crank 17 in this particular position is set at an angle of 45 degrees with respect to and in advance of the upper dead-center or center-line position of the connecting rod 15. The piston 14 is thus in the same position as in a standard motor at the time of maximum compression and explosion or firing, in a straight line with the connecting rod and crank, the worst and most undesirable position for delivering power to the crank shaft, while the advanced position of the connecting rod and the crank with respect to the piston 13 is such as to produce a leverage $x—y$ which is approximately 70 per cent of the full leverage of the crank shaft and permit the delivery of power to the crank shaft on the working stroke at the highest efficiency which multiplies the power delivered to the crank shaft due to the ease of movement at this point during the beginning of the working stroke. In the V or space between the cylinders there is provided a relatively large but shallow cylinder 20, the chamber of which is placed in communication with a shallow passage 21 between and connecting the upper ends of the combustion chambers of the cylinders 7 and 8, through a restricted central opening 22 in a partition wall 23 at the top of and forming a head for the cylinder 20. The casing also has an opening 24 above the passage 21 of the same size as the cylinder to permit insertion of the piston, the jacket being left open at the top and the opening being closed by a cap 25 flanged as at 26 and bolted to the cylinder heads as at 27. This cap is double-walled or jacketed and has side branches 28 extending laterally and connected by couplings 29 to elbow pipes 30 which extend down and are in turn coupled to the outer portions of the water jackets of the cylinder heads 10 as indicated at 31 to establish a circuitous path for the cooling water which may be circulated by a pump (not shown) in the usual manner.

An auxiliary compression piston 32 works in the cylinder 20 and is reciprocated in any suitable manner in timed relation to the crank shaft 18 and pistons 13 and 14, at a ratio of speed of one to four. That is, there is one reciprocation of the piston 32 to each two reciprocations of the pistons 13 and 14. As shown, the piston 32 is actuated from a cam shaft 33 driven from the crank shaft 18 in any suitable way, as by means of a chain 34 trained around a sprocket 35 fixed on the crank shaft and a larger sprocket 36 fixed on the cam shaft 33 or direct gearing; the ratio of speeds between the shafts 18 and 33 being one to two. A cam shaft 37 is operated from the cam shaft 33, as by means of a chain 38 trained around a second smaller sprocket 39 on the shaft 33 and a larger sprocket 40 on the shaft 37, to rotate the shaft 37 one revolution for each four revolutions of the crank shaft 18.

Figure 1:
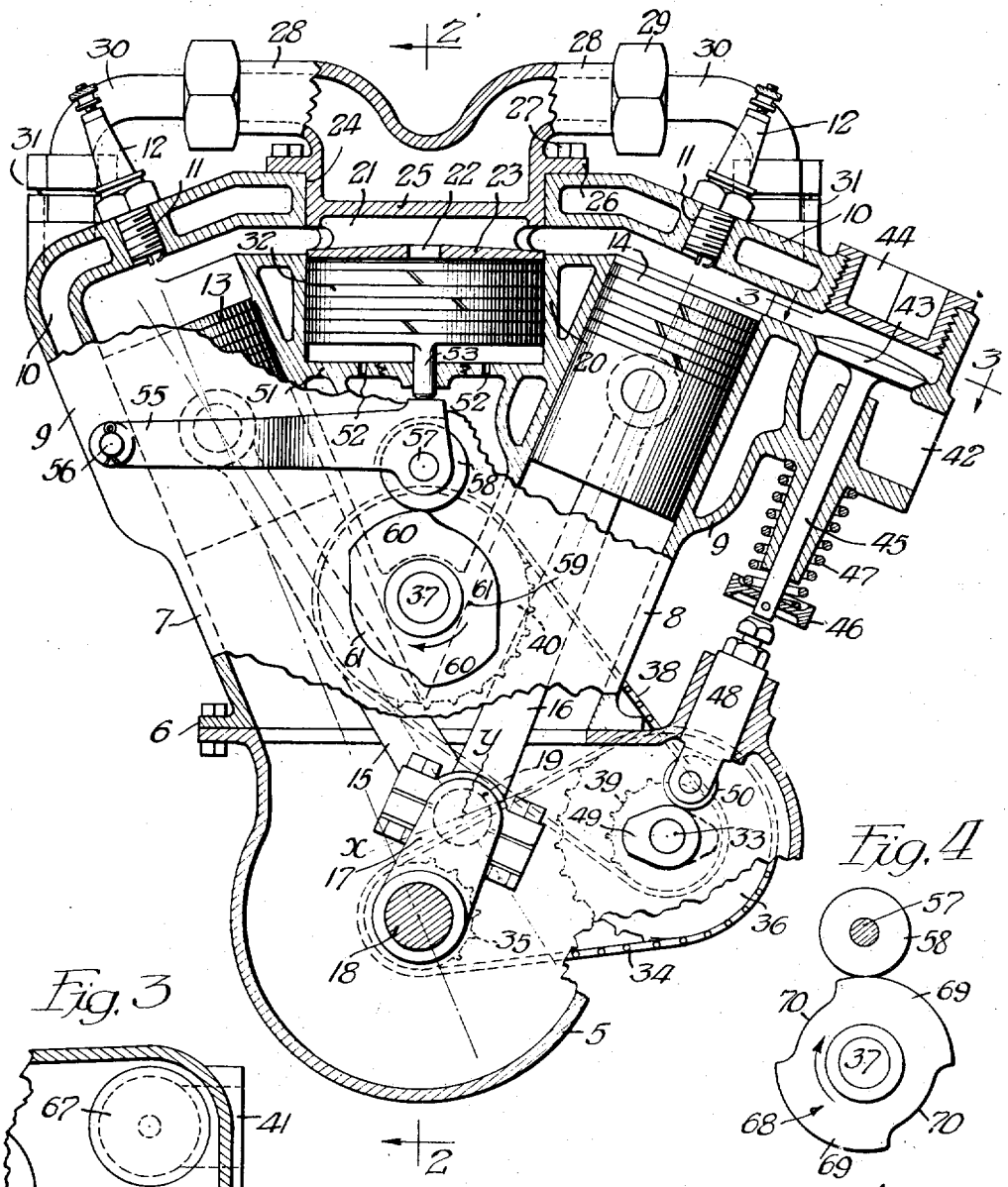
Fig. 1 is a transverse sectional elevation of a V-type four-cycle internal combustion motor constructed in accordance with my invention, the same being taken at right angles to Figure 2.
Figure 5:
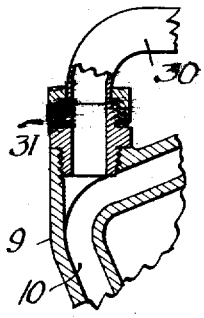
Fig. 5 is a detail sectional view of a water jacket connection.

The intake for each set of cylinders is indicated at 41 and the exhaust at 42 which are controlled by tappet or puppet valves 43 insertible through openings closed by removable plugs 44. The stems 45 of the valves carry enlargements 46 which are pressed by expansible coil springs 47 tending to normally seat the valves and the valves are unseated in properly timed relation by means of tappets 48 actuated by cams 49 on the cam shaft 33 which engage rollers 50 carried by the tappets to reduce friction between the parts. In Figure 1 the exhaust valve is shown and one of the cams 49 for actuating the same, as will be hereinafter more particularly related.

The cylinder 20 has a bottom wall 51 with bleed ducts 52 to permit free down stroke of the piston 32 and prevent the formation of a dash pot or the offering of resistance to the free movement of the auxiliary compression piston. The piston 32 is of relatively large area but has a very short stroke and, as illustrated in Figures 1 and 2, is provided with stems 53 operating through openings 54 in the bottom wall 51 and engaged by the upper contact portions at the free ends of arms 55 pivoted at 56 to the cylinder 7 or water jacket 9 thereof. The free or inner ends of the arms 55 are bifurcated to receive pivot pins 57 on which rollers 58 are journaled and adapted to engage cams 59 fixed to the shaft 37 in the relation shown in Figure 2 of the drawings. The cam 59 has two raised portions 60 disposed diametrically opposite and depressed portions 61 also disposed diametrically opposite to each other and at right angles to the raised portions 60 so that during rotation of the cams 59, the arms 55, and thus the piston 32, are alternately raised for one-quarter of the revolution of the cams and then allowed to drop. During the latter period, the piston 32 is forced on its down stroke by means of a coil expansion spring 62 disposed around a sleeve 63 extending downwardly from the bottom wall 51 and movably receiving a rod 64 axially secured to the piston 32, as indicated at 65, and extending down through the sleeve 63 which forms a tubular extension of the bottom wall 51 of the cylinder 20. An enlargement 66 is secured to the rod 64 and is engaged by the lower end of the spring which normally tends to hold the piston 32 downwardly. The intake valve is shown at 67 in Figure 3 of the drawings and corresponds to the structure of the exhaust valve but is operated from the cam shaft 33 to open on the suction strokes of the pistons 13, 14, and 32.

In the operation of the engine as described, the parts are in the positions shown in Figure 1 when under compression or when about to proceed on the working stroke. In this position the gases have been previously drawn into the cylinders or combustion spaces thereof, as well as the passages connecting the same including the passage 21 when the intake valve 67 is open and the pistons 13 and 14 moved downwardly on the suction stroke. At this time the roller 58 is about to enter upon one of the depressed portions 61 of the cam 59, thereby permitting the piston 32 to be moved downwardly under the action of the spring 62 to suck the gas into the cylinder 20 through the passage 21 and the opening 22. During the continued movement the pistons 13 and 14 will move upwardly on the compression stroke and when the next raised portion 60 of the cam 59 engages the roller 58, the piston 32 will be forced outwardly on the compression stroke to compress the gases through the opening 22 into the passage 21 and above the working cylinders. This action takes place as the crank 17 has moved over the intermediate position in line with the shafts 18 and 37 until the piston 13 has advanced slightly as shown in Figure 1 so that the action of the auxiliary compression piston 32 will maintain the maximum pressure above the piston 13, as well as above the piston 14. At this point the gases are fired through the spark plugs or ignition devices 12 and a free action will result to impart movements to the pistons 13 and 14 on their working strokes due to the connection 19 being over the dead center with respect to the piston 13 by reason of the angular relation of the connecting rod 15 with the crank 17 at this point. As the pistons move on their working strokes, the roller 58 will continue upon the raised portion 60 of the cam 59 and will be maintained in this position during the return of the pistons 13 and 14 on their exhaust strokes, at which time the cam 49 will open the exhaust valve 43 to permit the discharge of the expended gases. The pistons 13 and 14 will then move downwardly on their suction strokes with the valve 43 closed and the valve 67 open, the cam 49 moving beyond the roller 50 and a corresponding cam (not shown) of the intake valve 67 on the shaft 33 holding it open. During the latter part of the downward strokes of the pistons 13 and 14, the roller 58 will enter upon a depressed portion 60 of the cam 59 and again permit the piston 32 to move downwardly on its suction stroke to draw the gases into the cylinder 20 to be compressed therein near the end of the compression strokes of the pistons 13 and 14 in the manner as and for the purposes already pointed out. The gases are again ignited as before and the cycle of operation is repeated during the successive working of the invention.

In Figure 4 of the drawings a modified form of cam is shown to be used in lieu of the cam 59, the same being designated at 68 and having the raised portions 69 and the depressed portions 70 which produce the same effect in operation as the corresponding raised portions 60 and the depressed portions 61 of the cam 59.

It is claimed for the present internal combustion engine or motor that, owing to the ease and facility with which the pistons are moved on their working strokes by the advancement of the crank with respect to one of the pistons, the power will be more uniformly and efficiently transmitted to the crank shaft, thereby overcoming the inefficient dead-center position to which power is ordinarily imparted on the working strokes of the pistons in standard engines, thus producing greater power for a motor of corresponding size without losing efficiency due to lack of compression and a minimum quantity in the consumption of gas or other fuel.

It is also to be understood that while I have only shown two cylinders, any number of pairs thereof may be arranged in line to drive the common crank shaft 18, this being well within the principles of the invention as set forth.

While I have shown and described my invention in a preferred form, I am aware that various modifications and changes may be made without departing from the spirit of the invention, the scope of which may be determined by reference to the following claims.

I claim as my invention:

1. In a four-cycle internal combustion engine, a plurality of cylinders arranged in inclined relation, pistons working in said cylinders, and a shallow auxiliary compression member between pairs of said cylinders having connection with said cylinders to compress the gases therein when one of the pistons has moved over the dead-center position on its working stroke and the other is in its dead center position to create an initial starting leverage on firing.

2. In an internal combustion engine, a pair of cylinders arranged in V-shaped relation, pistons therein and having connection with a common crank shaft, an auxiliary cylinder between the aforesaid cylinders and considerably enlarged with respect thereto, said auxiliary cylinder having a small opening at the top establishing communication with the combustion spaces thereof on each side, a short-stroke shallow piston operating in the auxiliary cylinder, and means for actuating the last-named piston on the end of the compression strokes of the first-named pistons.

3. In a four-cycle internal combustion engine, a pair of cylinders arranged in converging relation, pistons working therein and having connection with a common crank shaft, said pistons on their working strokes being set with the crank in the dead-center position as to one piston and advanced beyond the dead-center position as to the other piston, and compression means having a restricted port establishing communication with the cylinders to maintain compression in the cylinder of the advanced piston while the other piston is in a dead center compression position for firing.

4. In an internal combustion engine, a pair of cylinders arranged in converging relation, pistons working therein and having connection with a common crank shaft, said pistons on their working strokes being set with the crank in the dead-center position as to one piston and advanced beyond the dead-center position as to the other piston, an enlarged shallow auxiliary compression cylinder, and a cam-operated auxiliary compression piston in the latter cylinder, said latter cylinder having restricted connection with the combustion spaces of said cylinders to maintain the compression in said cylinders at the end of the compression strokes until firing with one piston over the dead center and advanced slightly.

5. In an internal combustion engine, a pair of cylinders arranged in converging relation, pistons working therein and having connections with a common crank shaft, said pistons on their working strokes being set with the crank in the dead-center position as to one piston and advance beyond the dead-center position as to the other piston, intake and exhaust manifolds leading into the cylinders, valves controlling the same, cam-actuated means controlling said valves to alternately open and close the same in timed relation with the intake and exhaust strokes of the pistons, an auxiliary cylinder between the first-mentioned cylinders and having a passage connecting the same at their combustion spaces, a piston working in said auxiliary cylinder for compressing the gases above the pistons at the end of their compression strokes, ignition means for the cylinders, and cam-operated means for actuating the piston in the auxiliary cylinder in timed relation to the first-mentioned pistons.

6. In an internal combustion engine, a pair of cylinders arranged in converging relation, pistons working therein and having connection with a common crank shaft, said pistons on their working strokes being set with the crank in the dead-center position as to one piston and advanced beyond the dead-center position as to the other piston, intake and exhaust manifolds leading into the cylinders, cam-actuated means controlling said valves to alternately open and close the same in timed relation with the intake and exhaust strokes of the pistons, an auxiliary cylinder between the first-mentioned cylinders and having a passage connecting the same at their combustion spaces, a piston working in said auxiliary cylinder for compressing the gases above the pistons at the end of their compression strokes, ignition means for the cylinder, means for normally moving said piston in the auxiliary cylinder to draw gases into the same on the suction strokes of the pistons in the first-mentioned cylinders, and cam-operated means driven from the crank shaft to move the piston in the auxiliary cylinder on its compression stroke timed with the compression strokes of the other pistons to maintain compression in the cylinders thereof when one of the pistons has advanced slightly before ignition of the gases therein, whereby said piston will start on its working stroke after ignition with the crank over the dead-center position.

7. In an internal combustion engine, jacketed cylinders arranged in V-shaped relation and having a passage connecting the combustion chambers thereof, pistons working in the cylinders and connected to a common crank shaft whereby in the compression positions previous to firing, the crank will be advanced beyond the dead-center position as to one piston, valve inlet and exhaust passages for the cylinders adapted to be alternately opened and closed in timed relation with the strokes of the pistons, a shallow cylinder of large area between the aforesaid cylinders and having communication with the passage therebetween, a piston working in the shallow cylinder, a jacketed cover over the passage and connecting the jackets of the first-mentioned cylinders, means for moving the piston in the shallow cylinder on its suction stroke near the ends of the suction strokes of the first-mentioned pistons, and means operated in timed relation with said pistons and the valved intake and exhaust passages to move the auxiliary piston on its compression stroke near the end of the compression strokes of the first-mentioned pistons and to maintain said compression during the working strokes thereof after ignition with one piston slightly advanced.

8. In an internal combustion engine, a pair of cylinders with a common passage between them, one piston being advanced relative to the other and each having connection with a crank shaft to obtain an initial starting leverage on the working stroke, and means between the cylinders adjacent the top and communicating with said passage for compressing the gases in front of the pistons in their respective cylinders and to maintain compression in the cylinder of the advanced piston as soon as the advanced piston moves down or over the dead center position for firing in such advanced position.

9. In an internal combustion engine, a crank shaft, a plurality of cylinders having intercommunication, pistons working therein and having connection with the crank shaft, certain of said pistons being set one in advance of the other to move over the dead center position prior to the others, valved intakes and exhausts for the cylinders, other cylinders communicating intermediately with the first cylinders, and auxiliary compression pistons in said last-named cylinders for maintaining the compression in the cylinders in which the pistons are advanced after they have gone over the dead center for firing with the cranks thereof set at an angle over the dead center position and operated in timed relation at a ratio of speed of one to four with respect to the crank shaft and first-named pistons.

10. In an internal combustion engine, a plurality of pairs of cylinders, a crank shaft, pistons working in said cylinders and having connection with the crank shaft, one of said pistons of each pair being set in advance of the other when both are in firing position, so as to move over the dead center position in timed relation, other shallow cylinders larger than the first cylinders, short-stroke auxiliary compression pistons in the last-named cylinders for maintaining the compression in the first cylinders in timed relation after the pistons therein have moved slightly over the dead center position, and means for firing the gases in said cylinders simultaneously, while the pistons are in advanced positions with the cranks thereof set at an angle over the dead center position.

11. An internal combustion engine having a plurality of working cylinders, an auxiliary compression device including a piston and cylinder, the latter having common communication with the working cylinders, a crank shaft, pistons working in said cylinders and having connection with the crank shaft, the crank of one piston being set on or about forty-five degrees past dead center with the piston advanced at the point of firing or explosion and highest compression of the working pistons, valved inlets and outlets for the cylinders, drive means therefor geared to the crank shaft, and said compression means also operated from the crank shaft.

12. In an internal combustion engine, a plurality of cylinders, a crank shaft, pistons working in said cylinders and having connection with the crank shaft, the crank of one piston being set on or about forty-five degrees past dead center with the piston advanced at the point of firing or exploson and highest compression valved inlets and outlets for the cylinders, operating means therefor geared to the crank shaft, a shallow cylinder having connection with the compression spaces of the first-named cylinders, a shallow piston in said shallow cylinder and of larger area than either of the aforesaid pistons, an arm pivotally mounted and operatively engaged with the shallow piston and a cam also geared to the crank shaft and having diametrically opposite depressed portions and diametrically opposite raised portions adapted for actuating the shallow piston in timed relation to the operation of the first-named pistons.

13. An internal combustion engine having multiple working cylinders and pistons, an auxiliary compression device including a piston and cylinder, the latter having common communication with the working cylinders, ignition means for the working cylinders, said engine having its firing or explosion point and highest compression when the crank shaft thereof is set on or about forty-five degrees over dead center and one of the pistons advanced on its working stroke.

14. An internal combustion engine including a pair of cylinders having fixed heads, a crank shaft, pistons working therein and connected to a common crank of the crank shaft, ignition means for the cylinders, said engine having its firing or explosion point and highest compression when the crank shaft thereof is set on or about forty-five degrees over the dead center and one piston is advanced on its working stroke, and means communicating with the cylinders for maintaining said compression at said firing point.

15. In a four-cycle internal combustion engine, the combination with a main cylinder, piston and crankshaft, of ignition means for firing the compressed charge in the main cylinder when the piston therein and crankshaft are advanced substantially past dead-center position, an auxiliary cylinder and piston communicating through a restricted passage with said main cylinder for maintaining high compression therein at the firing point, said auxiliary piston being of substantially larger area and of substantially shorter stroke than said main piston and cam means for effecting the suction and working strokes at the end of the suction stroke and the beginning of the working stroke respectively, of the main piston, and for maintaining said auxiliary piston substantially stationary during other portions of the engine cycle, substantially as described.

16. In an upright, four-cycle, internal combustion engine, a main cylinder and piston and an auxiliary cylinder and piston disposed side by side, said cylinders having heads at their upper ends and communicating at such ends through a restricted passage, said auxiliary cylinder and piston being of substantially larger area and substantially shorter than the main cylinder and piston, a crank shaft below said working cylinder, a pitman connecting said crank shaft and said main piston, a cam shaft below said auxiliary cylinder and geared to said crank shaft and a short throw cam on said cam shaft for effecting the compression and working strokes of said auxiliary piston at the beginning of the working stroke and during the suction stroke respectively of the main piston, whereby the compression of the charge in the main cylinder is maintained at the ignition point when the latter is effected after the main piston is advanced substantially beyond its dead center position, substantially as described.

ANTON ZEMAN.